(12) United States Patent
Gilbert

(10) Patent No.: US 6,529,942 B1
(45) Date of Patent: Mar. 4, 2003

(54) SYSTEM AND METHOD FOR PROVIDING RECIPIENT SPECIFIC FORMATS FOR ELECTRONIC MAIL

(75) Inventor: Timothy G. Gilbert, Erie, CO (US)

(73) Assignee: Gateway, Inc, Poway, CA (US)

(*) Notice: Subject to any disclaimer, the term of this patent is extended or adjusted under 35 U.S.C. 154(b) by 0 days.

(21) Appl. No.: 09/221,077

(22) Filed: Dec. 28, 1998

(51) Int. Cl.[7] .............................................. G06F 15/16
(52) U.S. Cl. .................................... 709/206; 707/526
(58) Field of Search ............................. 709/204, 206, 709/207, 245; 707/500, 501.1, 513, 526, 530, 531, 529; 345/733, 744, 747, 752

(56) References Cited

U.S. PATENT DOCUMENTS

| | | | |
|---|---|---|---|
| 5,283,887 A | | 2/1994 | Zachery ........................ 395/500 |
| 5,557,723 A | | 9/1996 | Holt et al. .................... 395/149 |
| 5,579,466 A | | 11/1996 | Habib et al. ................. 395/793 |
| 5,621,875 A | | 4/1997 | Mason et al. ................ 395/793 |
| 5,627,764 A | | 5/1997 | Schutzman et al. ......... 364/514 |
| 5,648,916 A | | 7/1997 | Manduley .................... 364/514 |
| 5,740,231 A | * | 4/1998 | Cohn et al. .............. 379/88.22 |
| 5,872,926 A | * | 2/1999 | Levac et al. ................ 709/206 |
| 5,892,909 A | * | 4/1999 | Grasso et al. ............... 709/203 |
| 5,917,489 A | * | 6/1999 | Thurlow et al. ............ 345/347 |
| 5,928,325 A | * | 7/1999 | Shaughnessy et al. ...... 709/206 |
| 5,970,122 A | * | 10/1999 | LaPorta et al. ............. 379/170 |
| 6,016,478 A | * | 1/2000 | Zhang et al. ............... 709/202 |
| 6,044,395 A | * | 3/2000 | Costales et al. ............ 709/206 |
| 6,185,603 B1 | * | 2/2001 | Henderson et al. ......... 709/206 |
| 6,192,396 B1 | * | 2/2001 | Kohler ........................ 709/206 |
| 6,212,548 B1 | * | 4/2001 | DeSimone et al. ......... 709/204 |
| 6,247,045 B1 | * | 6/2001 | Shaw et al. ................. 709/207 |

OTHER PUBLICATIONS

Freed, et al; "Multipurpose Internet Mail Extensions (MIME) Part One", RFC 2045; Nov. 1996.*
Freed, et al; "Multipurpose Internet Mail Extensions (MIME) Part Two", RFC 2046; Nov. 1996.*
Moore, K.; "Multipurpose Internet Mail Extensions (MIME) Part Three", RFC 2047; Nov. 1996.*
Freed, et al; "Multipurpose Internet Mail Extensions (MIME) Part Four", RFC 2048; Nov. 1996.*
Freed, et al; "Multipurpose Internet Mail Extensions (MIME) Part Five", RFC 2049; Nov. 1996.*
Van der Meer et al., "An approach for a 4th generation messaging system", Mar. 1999, Autonomous Decentralized System IEEE '99, pp. 158–167.*

* cited by examiner

Primary Examiner—Mark Powell
Assistant Examiner—Marc D. Thompson
(74) Attorney, Agent, or Firm—Scott Charles Richardson; Rodney L. Lacy; Schwegman, Lundberg, Woessner & Kluth

(57) ABSTRACT

An electronic mail system and method which allows an originating user to customize text for a specific recipient in a multiple recipient electronic mail system. The system recognizes embedded processing codes based on a code specific to each recipient's message. Upon recognizing the embedded processing codes, the system and method generates separate, properly formatted electronic mail messages for each recipient.

28 Claims, 6 Drawing Sheets

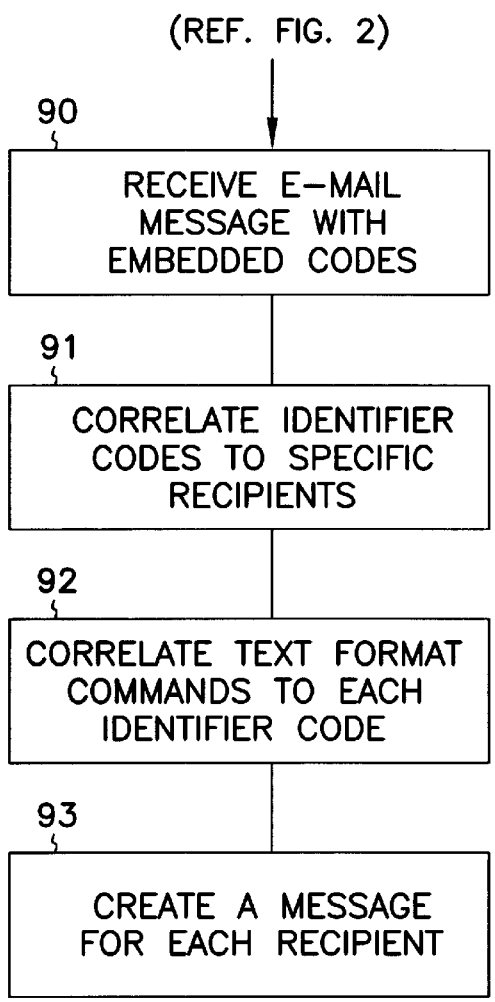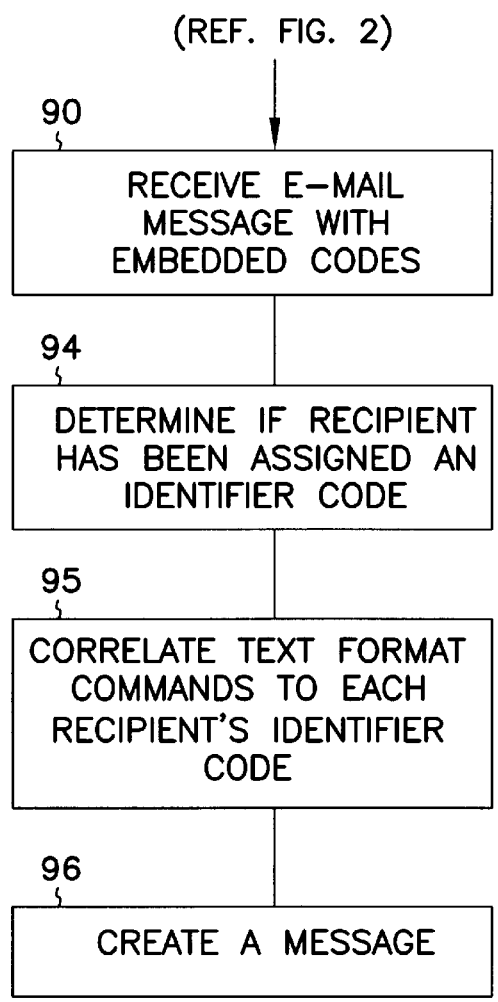
FIG. 4A                    FIG. 4B

110~TO: JOHN[a], FRED[b]

120~[a,oi]JOHN'S ACTION ITEMS: [a,Oi] FINISH TESTING THE NEW PROTOTYPES.

130~[b,ob]FRED'S ACTION ITEMS: [b,Ob,Ou]COMPLETE SALES PLAN BY THURSDAY, [b,Ou]

140~[a,b,ob]ALL[a,b,Ob]: DON'T FORGET TO TURN IN EXPENSE REPORTS AND WEEKLY PROGRESS REPORTS BY FRIDAY.

FIG. 5

RECEIVER SENSITIVE FORMATTING EXAMPLE:

ORIGINAL DOCUMENT:

```
FROM: TOM
TO:   JOHN, HARRY, MARY
HERE ARE THE ACTION ITEMS FROM THE MEETING:
DICK: SEND PURCHASE ORDERS BY NEXT WEEK.
MARY: COMPLETE MARKETING PLAN.
HARRY: FINISH USER MANUALS.
```

WHAT JOHN WOULD RECEIVE:

```
FROM: TOM
TO:   JOHN, HARRY, MARY
HERE ARE THE ACTION ITEMS FROM THE MEETING:
JOHN: SEND PURCHASE ORDERS BY NEXT WEEK.
MARY: COMPLETE MARKETING PLAN.
HARRY: FINISH USER MANUALS.
```

MARY WOULD RECEIVE:

```
FROM: TOM
TO:   JOHN, HARRY, MARY
HERE ARE THE ACTION ITEMS FROM THE MEETING:
DICK: SEND PURCHASE ORDERS BY NEXT WEEK.
MARY: COMPLETE MARKETING PLAN.
HARRY: FINISH USER MANUALS.
```

HARRY WOULD RECEIVE:

```
FROM: TOM
TO:   JOHN, HARRY, MARY
HERE ARE THE ACTION ITEMS FROM THE MEETING:
DICK: SEND PURCHASE ORDERS BY NEXT WEEK.
MARY: COMPLETE MARKETING PLAN.
HARRY: FINISH USER MANUALS.
```

FIG. 6

SYSTEM AND METHOD FOR PROVIDING RECIPIENT SPECIFIC FORMATS FOR ELECTRONIC MAIL

FIELD OF THE INVENTION

The present invention relates generally to electronic mail systems and more particularly to systems and methods for providing recipient specific formats in electronic mail.

BACKGROUND OF THE INVENTION

The use of word processing programs and electronic mail systems has resulted in a recurring problem for customizing a section of an electronic mail message for a particular recipient when the same message is also sent to other recipients. Presently, if an originating user wants to highlight a paragraph of a message for a particular recipient, then the paragraph is highlighted for everyone else receiving the message. Current technology only allows sending the same message to everyone on a list and does not allow for individual customizing of a single message for different recipients. The only current solution is for the originating user to make multiple copies of the message and then individually customize and send out a separate copy to each recipient separately.

To illustrate this problem, assume an office manager wants to send via electronic mail an assignment list to three different employees on his support staff, where each staff member is to have a delegated task. If the office manager wants to highlight in the message the delegated task corresponding to a staff member without the other staff members receiving the same highlighted section, then the office manager must make three copies of the message and separately highlight the particular sections for each staff member. In other words, three different versions of the same message are created and sent by the office manager.

Therefore, what is needed is an electronic mail system that allows an originating user to customize a message based on who the receiver is without the originating user having to generate multiple versions of the original message for other recipients. For the reason stated above, and for other reasons stated below which will become apparent to those skilled in the art upon reading and understanding the present specification, there is a need in the art for a method of allowing an originating user to individually customize an electronic mail message for different recipients using a single message.

SUMMARY OF THE INVENTION

Recipient sensitive format commands in an electronic mail system are supported by embedded processing codes within the text of an electronic mail message. An originating user of the electronic mail message causes the format commands to be embedded within the text, including an identifier code for identifying a specific recipient's electronic mail message. The embedded format commands are recognized for automatically generating a separate, properly formatted electronic mail message for each specific recipient.

In one embodiment, a method of formatting text based on a specific recipient in a multiple recipient electronic mail system is presented. The method comprises the steps of receiving an e-mail message, embedding processing codes within the e-mail message, and automatically generating individualized messages for one or more specific recipients based upon the embedded processing codes. A computerized system and network for formatting text based on a specific recipient in an electronic mail system is also presented.

An advantage of recipient specific format commands in an electronic mail system is that such commands allow an originating user of an electronic mail message to individually customize the text of the message based on who the receiver is. Allowing an originating user to individually customize an electronic mail message for different recipients and having a system that automatically creates individualized messages avoids having the originating user duplicate the original message and tailor it for each recipient. Furthermore, when a recipient receives a message with highlighted text, the recipient is able to quickly focus on a section of the message that may be of particular interest. When an individual is reading or opening a large number of messages, text that is highlighted ensures that the recipient will more likely notice the pertinent part of the message.

Therefore, software designed to format text based on a specific recipient in a multiple recipient electronic mail system allows an originating user to automatically generate multiple versions of a message from the original message. In alternative embodiments of the invention, methods of automatically creating individualized messages of varying scope are described. For instance, the individualized messages are automatically created by the electronic mail software located on the originating user's end or on the receiver's end. Still other and further embodiments, aspects and advantages of the invention will become apparent by reference to the drawings and by reading the following detailed description.

BRIEF DESCRIPTION OF THE DRAWING

FIG. 4A is a flow chart of one embodiment of the subroutine steps necessary for automatically creating individualized e-mail messages by an originating user's electronic mail system.

FIG. 4B is a flow chart of one embodiment of the subroutine steps necessary for automatically creating an individualized e-mail message by a recipient's electronic mail system.

FIG. 5 is a representative electronic mail message having embedded processing codes in the text of the message.

FIG. 6 is a representative electronic mail message that illustrates automatically created messages due to recipient specific text formatting commands.

DETAILED OF PREFERRED EMBODIMENTS

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The present invention is embodied in a functional component that recognizes embedded processing codes for a specific recipient in an e-mail system. This functional component can be integrated into e-mail software or can exist separate from the electronic mail software. Upon recognition of an embedded text format command, the functional component changes the font characteristics of selected text for specific recipients based upon an identifier code identifying each recipient's message. Individualized copies of the original message are automatically created for each recipient. The invention thus allows a single message to be modified for more than one recipient such that individual modifications corresponding to a particular recipient are received only by that recipient. A computerized network serving as an environment for the present invention is first described. Next, the processing steps required to format text for a specific recipient are described along with the processing steps necessary for automatically creating e-mail messages. Examples of e-mail messages with embedded processing codes are also presented.

Figure 1:
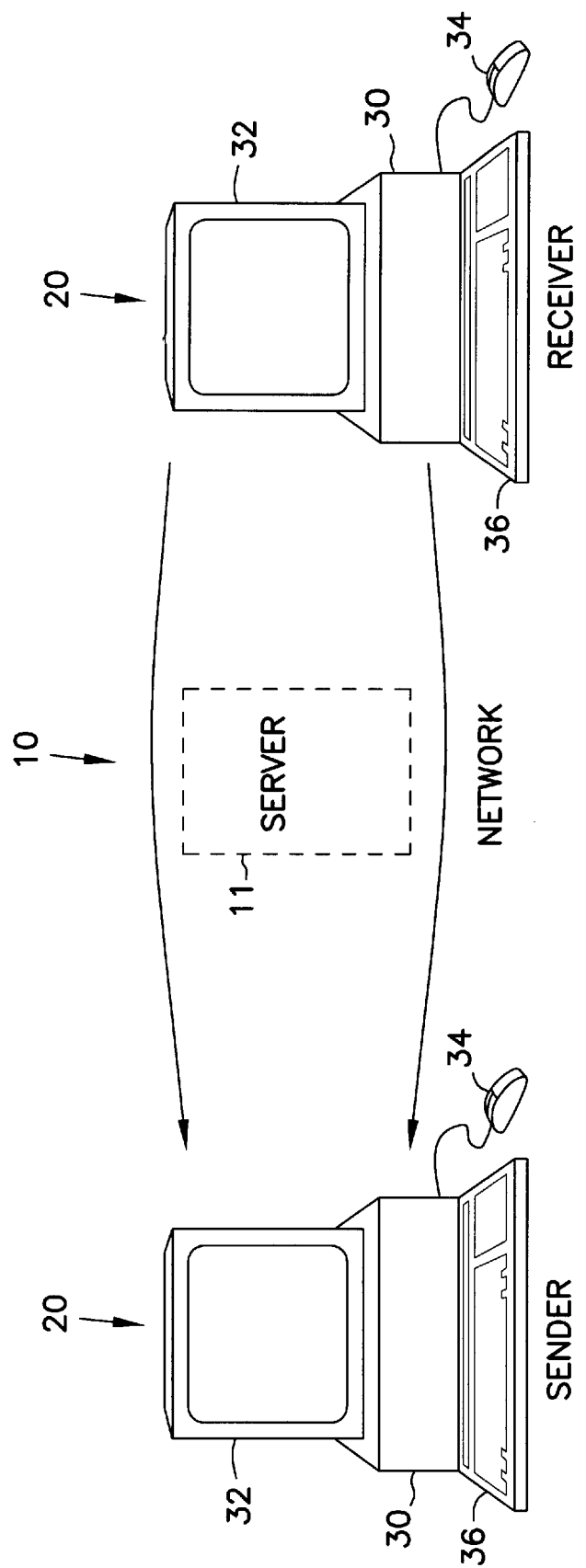
FIG. 1 illustrates an embodiment of a computer network configuration serving as an environment for the present invention.

FIG. 1 illustrates an embodiment of a computer network configuration 10 suitable for practicing the present invention. The network 10 is made up of a plurality of data processing systems 20 having e-mail software incorporated into each data processing system 20 for sending and receiving e-mail messages through the network 10. A server 11 (shown in phantom) can also be coupled to the data processing systems 20. The server 11 has e-mail software stored thereon for functioning as a mail server for sending and receiving e-mail messages through the network 10.

The data processing system 20 is typically a computer 30 having a processor (such as an Intel Pentium® microprocessor), random-access memory (RAM), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media well known in the art.

The computer 30 is coupled to a monitor 32, a pointing device 34 and a keyboard 36. The data processing system 20 is not limited to any particular type of computer 30. In one embodiment, the data processing system 20 is a PC-compatible computer running a version of the Microsoft Windows® operating system. The construction and operation of such computers 30 are well known within the art.

The monitor 32 displays information for viewing by a user of the computer 30 and the pointing device 34 is used to control a screen pointer provided by the graphical user interface of operating systems such as versions of Microsoft Windows®. The invention is not limited to any particular monitor 32 or pointing device 34. In one embodiment, the data processing system 20 is a Gateway 2000, Inc.®, desktop personal computer, the monitor 32 is a CRT display, and the pointing device 34 is a mouse.

As shown in FIG. 1, the two data processing systems 20 are coupled together via the network 10. In one embodiment, computer 30 includes a modem and corresponding communication drivers to connect to the Internet via what is known in the art as a "dial-up connection." In another embodiment, the data processing systems 20 are coupled together in only a local-area network (LAN). In yet another embodiment, the computer 30 includes an Ethernet or similar hardware card to connect to the local-area network that itself is connected to the Internet via what is known in the art as a "direct connection" (e.g., T1 line, etc.). In further embodiments, the computer 30 may be connected to the Internet using a cable modem or satellite Internet connectivity.

The invention is not limited to a particular type of network system to which the data processing systems 20 are connected. Typical network interfaces include general-purpose systems such as POTS (plain-old telephone systems) and ISDN (Integrated Services Digital Network), as well as special-purpose systems such as a LAN (local-area network) or a WAN (wide-area network). Such networking environments are commonplace in offices, enterprise-wide computer networks, intranets and the internet. Those skilled in the art will appreciate that the principles of the present invention can be applied to virtually any network system without departing from the scope of the invention.

The present invention recognizes processing codes embedded within an e-mail message so that selected text within the message can be changed for specific recipients based upon an identifier code corresponding to each recipient's message. Furthermore, the present invention automatically creates an e-mail message corresponding to each specific recipient after the embedded processing codes have been correlated to each recipient. The functions of the present invention can be implemented within an e-mail system or can be provided as an add-on component to the e-mail system. The present invention is not limited to any particular e-mail system and one skilled in the art will recognize that the teaching of the present invention can be implemented in a variety of e-mail systems.

The particular methods performed by the invention to provide these functions comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the invention.

The logical functions of the methods are described in terms of a network environment such as network 10 in FIG. 1. The functions can be distributed across processors connected through standard local area networks, wide area networks, dedicated phone lines or other communication means. Such networks can be client/server or peer-to-peer. The software program executes under an operating system such as Unix, Windows 95®, Windows NT®, and on industry standard workstations and/or personal computer hardware.

Figure 2:
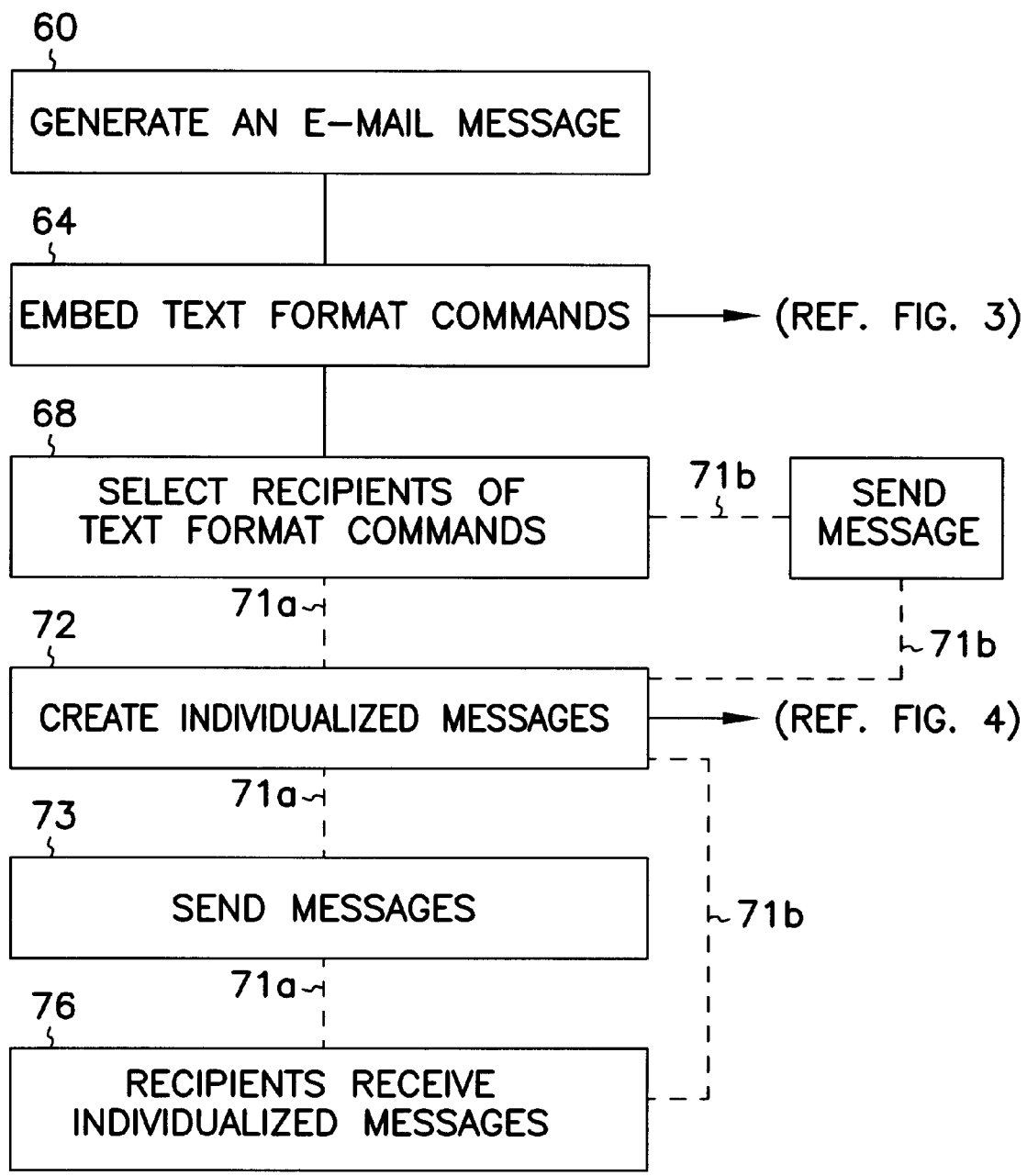
FIG. 2 is a flow chart showing one embodiment of the steps necessary for formatting text for a specific recipient in an electronic mail system.

FIG. 2 is a flow chart showing the steps performed by a machine readable or software embodiment executing on a networked computer that formats text for a specific recipient in an e-mail system. In step 60, the software generates an e-mail message after a user accesses an e-mail program and originates the message. The software embeds text format commands into the message (step 64), according to specific commands inserted into the message by the originating user. In one embodiment, the text format commands are embedded into the text of the message. The first occurrence of a text format command activates a selected feature of a text format code (e.g., size, color, bold, italic, superscript, subscript, etc.) while the next occurrence of the text format command disables the selected feature. In one embodiment, format commands are enclosed in brackets and are not displayed in the actual message. The selected features thus support various text attributes such as size, color and style. The step 64 of embedding text format commands is described in more detail with reference to FIG. 3.

After text format commands have been embedded within the e-mail message, the software prompts the user to select the recipient(s) who are to receive a modified e-mail message (step 68). This may be accomplished by the originating user assigning an identifier code for each recipient. The software uses the identifier code to correlate embedded text commands for a particular recipient's message. One embodiment of implementing an identifier code is for the user to select a number or letter and place it with the recipient's e-mail name as embedded information at the start of the message. Embedding an identifier code to a recipient's e-mail name is accomplished similar to embedding text format commands as discussed in step 64.

For example, if Smith is a specific recipient and his e-mail address is Smith@xyz.com, the software allows an originating user to embed [Smith=3] at the start of the message. Embedded text format commands corresponding to the number "3" thus identify Smith as the specific recipient for the text format changes. One skilled in the recognizes that there are other alternative methods for assigning identifier codes to the recipients.

After an e-mail message has been generated (step 60), text format commands have been embedded (step 64), and recipients of the text format commands have been selected (step 68), one embodiment of the software then automatically creates the individualized messages for each specific recipient (step 72). In this embodiment of the software shown in FIG. 2, the e-mail is sent in step 73, and in step 76, the individual recipients receive the individualized messages. This embodiment is shown in the flowchart of FIG. 2 with dotted lines 71a indicating the appropriate method step sequence. An alternative embodiment of the software is shown in the flowchart of FIG. 2 with dashed lines 71b indicating the appropriate method step sequence. In this alternative embodiment, after an e-mail message has been generated (step 60), text format commands have been embedded (step 64), and recipients of the text format commands have been selected (step 68), the encoded e-mail message is sent in step 75, individualized messages are created in step 72, and the individual recipients receive the individualized messages in step 76

As will be readily recognized by one skilled in the art, a variety of embodiments for automatically creating individualized e-mail messages are possible. In one embodiment, the software is installed in the originating user's data processing system 20 which analyzes or parses the message and generates a separate, properly formatted e-mail message for each recipient. In another embodiment, a computer coupled to the network 10 as a mail server 11 contains the software which processes the original e-mail message having the embedded processing codes. The mail server 11 analyzes both the text format commands and the identifier codes embedded in the message and generates a separate, properly formatted e-mail message for each recipient. In the two embodiments just described, the e-mail message received by a recipient is properly formatted and does not contain any formatting codes. Therefore, the present invention can be implemented transparently to the e-mail program operating at a recipient's data processing system 20. The step 72 of automatically creating individualized messages by the originating user's e-mail system is described in more detail with reference to FIG. 4A.

In another embodiment of the present invention, the software is installed in the recipient's data processing system 20 which processes the identifier codes embedded in the message for correlating an identifier code to the recipient. If the recipient has been assigned an identifier code by the originating user, the recipient's data processing system 20 processes the embedded text format commands correlating to the recipient and automatically generates a separate, properly formatted e-mail message.

To determine if a recipient has been assigned an identifier code, the software in the recipient's data processing system 20 processes embedded commands within the message for correlating the recipient's e-mail user name with an assigned number or letter. For example, if Smith is the specific recipient and his e-mail address is Smith@xyz.com, then the software in Smith's data processing system 20 processes embedded codes to determine if "Smith" has been placed in brackets and assigned an identifier code.

In the example given above for assigning identifier codes (step 68) on the originating user's data processing system 20, "Smith" was assigned the number "3" and this information was placed at the start of the message within brackets, e.g., [Smith=3]. The software in Smith's data processing system 20 processes the embedded commands for determining that recipient "Smith" has been assigned identifier code "3" and any embedded text format commands corresponding to the number "3" thus identify "Smith" as the specific recipient for the text format changes. Automatically creating individualized messages (step 72) by the recipient's e-mail system is described in more detail with reference to FIG. 4B.

In this particular embodiment of the present invention, each recipient's data processing system 20 receives all the embedded text format commands encoded in the message, but each recipient's data processing system 20 decodes only the inserted text format commands relevant to them based on each recipient's assigned identifier code.

Figure 3:
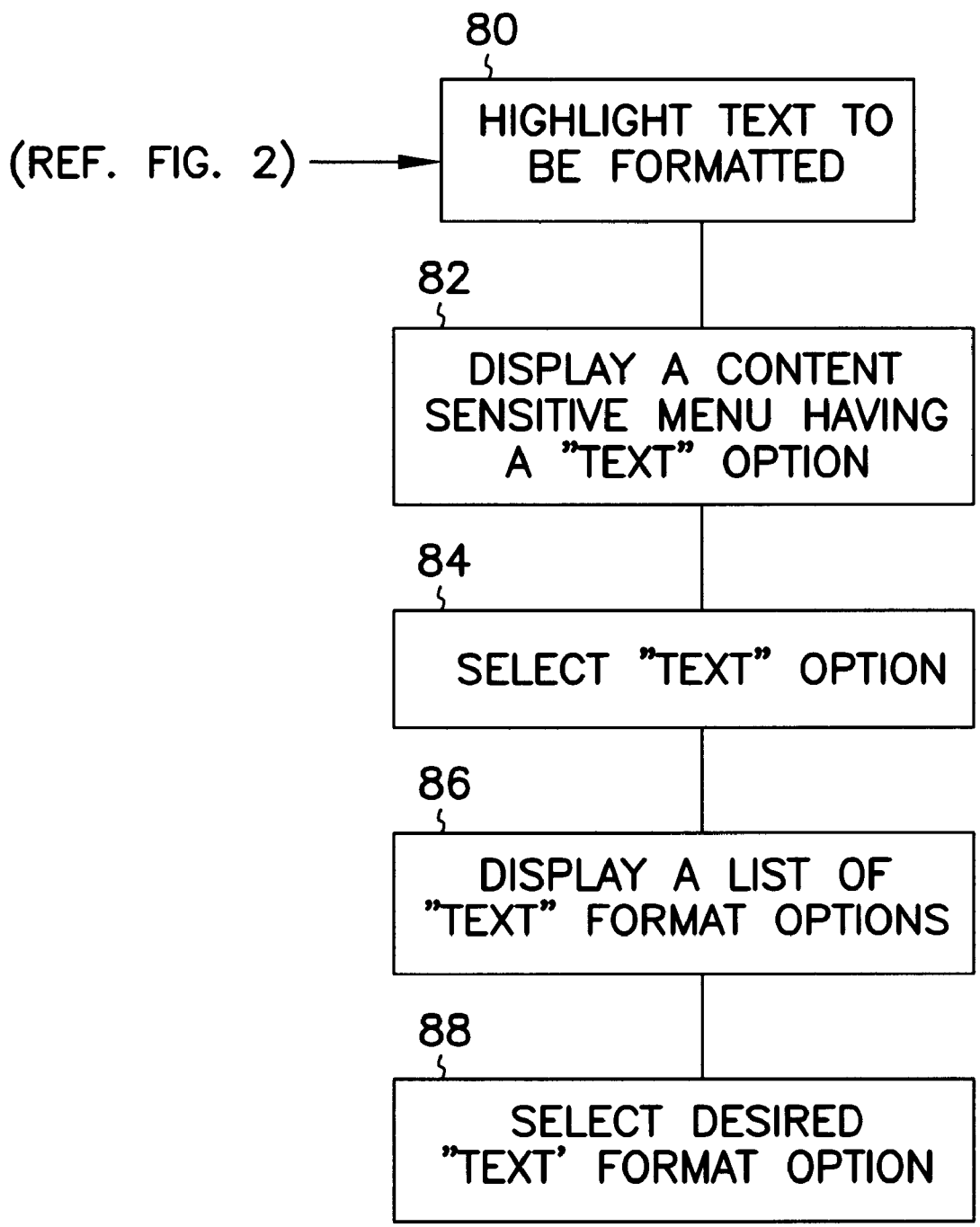
FIG. 3 is a flow chart of one embodiment of the subroutine steps necessary for inserting text format commands into an electronic mail message.

FIG. 3 is a flow chart of one embodiment of the subroutine steps necessary for embedding text format commands into an e-mail message. The steps illustrated in FIG. 3 correspond to step 64 in FIG. 2. After a user has generated the e-mail message (step 60 in FIG. 2), the software determines the text to be formatted as selected by the originating user within the e-mail message (step 80). In one embodiment, the originating user holds down a left mouse button on a mouse serving as a pointing device 34 and drags the screen cursor until the desired text has been highlighted or selected. One skilled in the art will realize that there are other acceptable ways of selecting text displayed on a screen.

Next, the software displays a content sensitive menu (step 82) to allow the user to select from a group of displayed functions. The content sensitive menu is displayed in response to the user clicking a right button on the mouse. Typical content sensitive menus in e-mail software programs allow the user to select from such options as "spell check", "thesaurus" or "quick help." The present invention requires modification to e-mail software for adding a "font" or "text" option similar to the "font" option available in a typical word processing program. Modifying the e-mail software to include additional options (e.g., a "text" option) to a content menu is well known to one skilled in the art, and thus is not discussed in any further detail.

After a "text" option is displayed in step 82, the user initiates step 84 by selecting the "text" option. The software then displays a list of text format options (step 86) corresponding to the "text" option displayed via the content sensitive menu. An illustrative example of available text format options include: font face (i.e., Courier, Times New Roman), font style (i.e., regular, italic), front size, appearance (i.e., underline, shadow), position (i.e., superscript, subscript) and color. The software can be modified to provide any or all of these format options. Finally, the user initiates step 88 for selecting the desired text format option by clicking the left mouse button.

FIG. 4A is a flow chart of one embodiment of the subroutine steps necessary for automatically creating individualized e-mail messages by the originating user. These subroutine steps can be integrated into the originating user's e-mail system or can be implemented as an add-on function separate from the originating user's e-mail system. The steps illustrated in FIG. 4A correspond to step 72 in FIG. 2. The present invention receives an e-mail message having embedded processing codes within the message (step 90). The software correlates the embedded identifier codes to a specific recipient for determining which recipients are to receive the text format codes (step 91). Next, the software correlates the embedded text format commands to the identifier codes (step 92) for determining what changes are to be made to the message. Finally, the software automatically creates a message for each recipient based upon the embedded processing codes (step 93).

The above described embodiment of automatically creating individualized e-mail messages is performed by having the, software installed in the originating user's data processing system 20 or in a computer coupled to the network 10 such as a mail server 11. Since the e-mail message received by a recipient is properly formatted and does not contain any visible formatting codes, the steps outlined in FIG. 4A are done transparent to the recipient. Therefore, the embodiment illustrated in FIG. 4A is transparent to the e-mail program operating at a recipient's data processing system 20.

Another embodiment of the subroutine steps necessary for automatically creating individualized e-mail messages is to have the software installed in the recipient's data processing system 20 or in a computer coupled to the network 10 such as a mail server 11. In either case, the software processes the identifier codes embedded in the message for correlating an identifier code to the recipient. FIG. 4B is a flow chart of one embodiment of the subroutine steps required for automatically creating an individualized e-mail message. In step 90, the recipient receives a message having embedded processing codes. Next, the software determines if the recipient has been assigned an identifier code (step 94).

If the recipient has not been assigned an identifier code, then the embedded processing codes are ignored. If an identifier code has been assigned, then the software correlates the embedded text format commands to the recipient's identifier code. To determine if an identifier code has been assigned, the software matches the recipient's user name with the embedded processing codes to find a match. If a match is found, the number or letter used as an identifier code is recognized by the recipient's software. Those skilled in the art will appreciate that the principles of the present invention can be applied to virtually any method of assigning and retrieving identifier codes for recipients in an e-mail system.

Once, the recipient's software determines its identifier code, the software correlates the embedded text format commands to its identifier code (step 95). After the embedded text format codes have been processed, the software automatically generates a properly formatted e-mail message (step 96).

FIG. 5 is an example embodiment of an electronic mail message 100 having embedded processing codes in the text of the message. In this embodiment, all embedded processing codes are placed in brackets. Embedded processing codes comprise identifier codes 102 and text format codes 104. In alternative embodiments of the invention, other schemes are used to embed the processing codes without departing from the scope of the invention. Included within the processing codes are identifier codes 102 assigned to each recipient receiving a modified message. For example, line 110 in the exemplary electronic mail message 100 presented in FIG. 5 has recipient John identified by the letter "a" placed in brackets, e.g., [a], and Fred identified by the letter "b", which is also placed in brackets, e.g., [b]. When an embedded processing code is found within a message by the software, the software looks for a reference corresponding to a particular recipient which has been provided by the originating user of the message. If an embedded processing code is not associated with any known recipient, then the embedded text format codes are ignored.

An illustrative example of implementing text format codes 104 places the number "0" before a letter corresponding to the desired feature. For example, "b" corresponds to bold, "i" corresponds to italics, "u" corresponds to underline and "s" corresponds to script. To recognize color codes, the letter "c" refers to color and the letters "r", "b" and "g" correspond to the colors red, blue and green, respectively. Referring to line 120, the text "John's action items" is surrounded by embedded processing code [a,0i]. The letter "a" is a processing code referring to "John" as the recipient and code "0i" puts the enclosed text in italics. This portion of the message is in italics only for John and not for any other recipients of the message 100.

In line 130, the first part of the text to be highlighted for Fred is surrounded by brackets wherein the letter."b" is inserted to correspond to Fred as being the recipient of the embedded codes. The code "0b" placed before and after the text "Fred's action items" causes the text to be placed in bold only for Fred. The remaining portion of line 130 is underlined because embedded codes "0 u" is placed before and after the text to be highlighted: "complete sales plan by Thursday." The originating user also has the option to insert a format code for more than one recipient. In line 140, the text "All" is surrounded by "a, b, 0b" which causes the text to be placed in bold for both John and Fred.

FIG. 6 is a representative electronic mail message 160 that illustrates automatically created messages due to recipient specific text formatting commands. Block 162 represents a message from Tom to be sent to three different recipients: John, Harry and Mary. By following the steps outlined in FIGS. 2 and 3, Tom uses the software to insert format codes such that each recipient receives the same message but with individual customized modifications. For example, the message represented in block 164 is received by John with his portion of the message 162 highlighted in bold. When Mary receives the message represented in block 166, her portion of the message 162 is underlined. Likewise, when Harry receives the message 162, his portion of the message is in bold, as represented in block 168. One of the advantages of the software allows a recipient to quickly focus in on the important part of a message pertaining to that recipient. Furthermore, this allows the originating user of the message to only create a single message instead of creating multiple different versions of the same letter.

A function for e-mail software has been described for recognizing text formatting commands for a specific recipient in an e-mail system. The function recognizes embedded processing codes for changing the font characteristics of selected text based on a code specific to each recipient's message. This allows a single message to be modified for more than one recipient such that individual modifications corresponding to a particular recipient are received only by that recipient. Three different embodiments of automatically creating individualized messages for each recipient were presented. One embodiment is to have the originating user's software analyze or parse the message and generate separate, properly formatted e-mail messages for each recipient. Another embodiment is to have a mail server 11 or an equivalent network device process the e-mail message when sending the message to the correct recipients. A third embodiment of processing inserted format commands and automatically creating individualized messages involves performing these tasks on the recipient's data processing machine 20. In this embodiment, each recipient receives all the inserted format commands that were encoded but their data processing system 20 only decodes the inserted format commands relevant to them.

Although specific embodiments have been illustrated and described herein, those of ordinary skill in the art will appreciate that any elements or arrangements of elements capable of achieving the same purpose may be substituted for the specific forms shown. This patent is intended to cover all adaptations or variations of the invention, limited only by the following claims and equivalents thereof.

What is claimed is:

1. A method of formatting text in an electronic mail message for a specific recipient in an electronic mail system, the method comprising the steps of:

embedding processing codes within the electronic mail message, said processing codes specifying a format for a subset of text of the electronic mail message, said processing codes having an association with at least one electronic mail recipient of a plurality of electronic mail recipients; and generating individualized messages for at least one of the plurality of electronic mail recipients based upon the embedded processing codes associated with the electronic mail recipient.

2. The method of claim 1 wherein the step of embedding processing codes comprises the steps of:

determining text to be formatted in response to a user selecting the text in the electronic mail message;

displaying a menu having a text option in response to user selection;

displaying at least one text format option in response to the user selecting the text option on the menu; and embedding corresponding text format commands within the electronic mail message in response to the user selecting at least one text format option.

3. The method of claim 2 wherein the user activating a pointing device causes the menu to be displayed.

4. The method of claim 2 wherein the step of displaying at least one text format option comprises the step of displaying text attributes.

5. The method of claim 4 wherein the text attributes displayed are selected from the group consisting of style, color, font and size.

6. The method of claim 1 wherein the step of embedding processing codes further comprises the step of embedding an identifier code corresponding to at least one of the plurality of specific recipients' individualized message.

7. The method of claim 1 wherein the step of generating individualized messages is performed external to a recipient's data processing system.

8. The method of claim 1 wherein the step of generating individualized messages is performed by a recipient's data processing system.

9. A machine readable medium having machine readable instructions stored thereon for causing a computer to perform, on an electronic mail message, the steps comprising:

embedding processing codes within the electronic mail message, said processing codes specifying a format for a subset of text of the electronic mail message, said processing codes having an association with at least one electronic mail recipient of a plurality of electronic mail recipients; and generating individualized messages for at least one of the plurality of electronic mail recipients based upon the embedded processing codes associated with the electronic mail recipient.

10. The machine readable medium of claim 9 wherein the step of embedding processing codes comprises the steps of:

determining text to be formatted in response to a user selecting the text in the electronic mail message;

displaying a menu having a text option in response to user selection;

displaying at least one text format option in response to the user selecting the text option on the menu; and embedding corresponding text format commands within the electronic mail message in response to the user selecting at least one text format option.

11. The machine readable medium of claim 10 wherein the step of displaying at least one text format option comprises the step of displaying text attributes.

12. The machine readable medium of claim 11 wherein the text attributes displayed are selected from the group consisting of style, color, font and size.

13. A system for formatting text in an electronic mail message for a specific recipient in an electronic mail system, the text formatting system comprising:

a processor;

a machine readable medium; and a plurality of machine readable instructions executed by the processor from the machine readable medium for performing the steps of:

embedding processing codes within the electronic mail message, said processing codes specifying a format for a subset of text of the electronic mail message, said processing codes having an association with at least one electronic mail recipient of a plurality of electronic mail recipients; and generating individualized messages for at least one of the plurality of electronic mail recipients based upon the embedded processing codes associated with the electronic mail recipient.

14. The computerized system of claim 13 wherein the step of generating individualized messages is performed external to a recipient's data processing system.

15. The computerized system of claim 13 wherein the step of generating individualized messages is performed by a recipient's data processing system.

16. A computer network comprising:

a first computer terminal for generating an electronic mail message having embedded processing codes within the message, said processing codes specifying a format for a subset of text of the electronic mail message, said processing codes having an association with at least one electronic mail recipient of a plurality of electronic mail recipients;

a server coupled to the first computer terminal for receiving the message and for processing the embedded processing codes, wherein an individualized message is created for and sent to the at least one electronic mail recipient; and a second computer terminal for receiving an individualized message without the embedded processing codes, wherein the individualized message corresponds to the at least one electronic mail recipient using the second data processing system.

17. The computer network of claim 16 wherein the embedded processing codes comprise an identifier code and text format commands corresponding to each specific recipient's electronic mail message.

18. The computer network of claim 17 wherein the text format commands cause attributes of selected text to change within the electronic mail message.

19. The computer network of claim 18 wherein the text attributes are selected from the group consisting of style, color, font and size.

20. A computer network comprising:

a first data processing system generating and sending an electronic mail message having embedded processing codes within the message, said processing codes specifying a format for a subset of text of the electronic mail message, said processing codes having an association with at least one electronic mail recipient of a plurality of electronic mail recipients; and a second data processing system receiving the electronic mail message, wherein the second data processing system processes the embedded processing codes for the at least one of the electronic mail recipients and generates an individualized message for that recipient.

21. The computer network of claim 20 wherein the embedded processing codes comprise an identifier code and text format commands corresponding to each specific recipient's electronic mail message.

22. The computer network of claim 21 wherein the text format commands cause attributes of selected text to change within the electronic mail message.

23. The computer network of claim 22 wherein the text attributes are selected from the group consisting of style, color, font and size.

24. A computer network comprising:

a first data processing system for originating an electronic mail message having embedded processing codes within the message for a plurality of specific recipients, said processing codes specifying a format for a subset of text of the electronic mail message, wherein the embedded processing codes are processed for creating and sending an individualized message for each specific recipient assigned an embedded processing code; and a second data processing system for receiving an individualized message without the embedded processing codes, wherein the individualized message corresponds to a specific recipient using the second data processing system.

25. The computer network of claim 24 wherein the embedded processing codes comprise an identifier code and text format commands corresponding to each specific recipient's electronic mail message.

26. The computer network of claim 25 wherein the text format commands cause attributes of selected text to change within the electronic mail message.

27. The computer network of claim 26 wherein the text attributes are selected from the group consisting of style, color, font and size.

28. A computer-readable medium having stored thereon a data structure, comprising:

a first data field containing data representing a specific recipient's name;

a second data field having an identifier code for the specific recipient represented in the first data field;

a third data field containing data representing text in an electronic mail message; and a fourth data field representing a text format command, wherein the text format command is directed to the data representing text in the third data field and identified by the second data field such that during a data processing operation an individualized electronic mail message is automatically created for the specific recipient represented in the first data field.

* * * * *